US008131311B2

(12) United States Patent  (10) Patent No.: US 8,131,311 B2
Bandera et al.  (45) Date of Patent: Mar. 6, 2012

(54) JUST-IN-TIME TRAINING OF DEPLOYED SKILL SUPPORT PERSONNEL VIA CELL PHONE MULTIMEDIA

(75) Inventors: Cesar Bandera, East Brunswick, NJ (US); Peter Schmitt, Mountain Lakes, NJ (US); Ed DeFrank, Northridge, CA (US); William Hart, Capitola, CA (US)

(73) Assignee: Bandemar Networks, LLC, East Brunswick, NJ (US)

( * ) Notice: Subject to any disclaimer, the term of this patent is extended or adjusted under 35 U.S.C. 154(b) by 687 days.

(21) Appl. No.: 12/055,123

(22) Filed: Mar. 25, 2008

(65) Prior Publication Data

US 2008/0242325 A1   Oct. 2, 2008

Related U.S. Application Data

(60) Provisional application No. 60/920,066, filed on Mar. 26, 2007.

(51) Int. Cl.
*H04W 4/00* (2009.01)
(52) U.S. Cl. ......................... 455/466; 370/465
(58) Field of Classification Search .................. None
See application file for complete search history.

(56) References Cited

U.S. PATENT DOCUMENTS

| 6,834,195 B2 | 12/2004 | Brandenberg et al. |
| 2005/0060245 A1 | 3/2005 | Hoffman et al. |
| 2005/0086582 A1 | 4/2005 | Frojdh et al. |
| 2006/0181411 A1 | 8/2006 | Fast et al. |
| 2006/0220838 A1 | 10/2006 | Wakim et al. |
| 2007/0214506 A1* | 9/2007 | Rao et al. ......................... 726/25 |
| 2008/0052415 A1* | 2/2008 | Kellerman et al. ........... 709/246 |
| 2010/0094878 A1* | 4/2010 | Soroca et al. ................. 707/748 |

* cited by examiner

*Primary Examiner* — Ajit Patel
(74) *Attorney, Agent, or Firm* — Stroock & Stroock & Lavan LLP (57) ABSTRACT

A content delivery system, such as a Just in Time Training (JITT) system which allows the broadcast of multimedia messages to recipients or users. The JITT system identifies the multimedia capabilities as well as the capabilities of the service provider and recipient device for each user and uses this profile information to determine an appropriate messaging format to use to send the message to each user. User involvement is used to determine the functionality and content type delivery for each user mobile device. This profiling may be performed in any of a number of different ways, including smart echo, caller-ID initiated (CIDI) and SMS initiated (SMSI) profiling. In smart echo profiling, the user sends the JITT system a multimedia sample from the mobile device, and the JITT system then sends messages and content to the mobile devise using the same format. In CIDI profiling, the JITT system sends test messages in different formats to the phone number of the device, and the user replies to the message having the best audiovisual experience. The system then uses the format associated with the reply message for further communications with the user. SMSI profiling is similar to CIDI profiling, except that the user sends an SMS instead of making a call. Users with multimedia recording devices, such as camera phones, can also upload multimedia through this system for subsequent broadcast. Users with data recording devices, such as toxic gas sensors, can also upload data through this system for subsequent conversion to multimedia and broadcast.

26 Claims, 6 Drawing Sheets

| Client Device | | Delivery Mechanism: | MMS via MM1 | E-mail Attachment | URL via SMS[3] | WAP Push[3] |
|---|---|---|---|---|---|---|
| Mobile | PC | Multimedia Format | | | | |
| Video phones | QuickTime | Video (3GP) | ♤ | 1 | ♤ | 2 |
| MS Smartphones | Media Player | Video (WMV) | ♤ | 1 | ♤ | 2 |
| Camera phones | Real Player | Slideshow w. audio (SMIL) | ♧ | 1 | ♧ | 2 |
| Blackberry | Web Browser | Slideshow w/o audio (HTML) | ♧ | ♤ | ♤ | ♧ |

♤ Commonly supported content/delivery mechanism combination   1 Requires carrier domain; received as MMS via MM1

♧ Rarely supported content/delivery mechanism combination   2 GSM carriers only     3 Directs microbrowser to content

*FIG. 6*

JUST-IN-TIME TRAINING OF DEPLOYED SKILL SUPPORT PERSONNEL VIA CELL PHONE MULTIMEDIA

This application claims the benefit of U.S. Provisional Application 60/920,066, filed Mar. 26, 2007, the entire disclosure of which is incorporated by reference.

Numerous references including various publications may be cited and discussed in the description of this invention. The citation and/or discussion of such references is provided merely to clarify the description of the present invention and is not an admission that any such reference is "prior art" to the present invention. All references cited and discussed in this specification are incorporated herein by reference in their entirety and to same extent as if each reference was individually incorporated by reference.

FIELD OF THE INVENTION

Embodiments of the present invention relate generally to computer systems. More specifically, embodiments of the present invention relate to computer systems for providing multimedia content to mobile devices.

BACKGROUND OF THE INVENTION

Skilled Support Personnel (SSP) are specialists dispatched to aid first responders in emergency incidents. They include laborers, operating engineers, carpenters, ironworkers, sanitation workers and utility workers. SSP called to an emergency incident rarely have detailed and recent training on the chemical, biological, radiological, nuclear and/or explosives (CBRNE) agents or the personal protection equipment (PPE) relevant to the incident. This increases personal risk to the SSP and mission risk at the incident site. To reduce personal risk and increase the effectiveness of dispatched SSP at an emergency site, a system to provide detailed and specific just-in-time training (JITT) is desirable.

At first glance, it would appear that the pervasiveness of multimedia-enabled mobile devices would lend itself to accessibility for providing JITT over wireless networks. However, for the foreseeable future, the mobile marketplace will continue to witness variability in the multimedia capabilities of mobile devices and in standards compliance by device manufacturers and service providers. Interoperability between service providers is further hampered by their "walled garden" approach to media services and subscriber retention. Thus, there is a challenge in the delivery of cross-provider and cross-device mobile media in identifying which of the many media formats and delivery protocols are in fact supported by each user.

Some mobile devices are configured with Internet browsing capability. Mobile devices typically access web content using the Wireless Application Protocol (WAP). A microbrowser is a web browser designed for use on a mobile device. Microbrowsers are generally optimized to take into account memory capacity, bandwidth, and display size, which are often limited on mobile devices. A drawback of all microbrowsers, compared to desktop and laptop browsers, is their inability to simultaneously render imagery and audio. Specifically, microbrowsers pass any audio or video content encountered in a web page to the cell phone's built-in audio or video decoder (if it has one). The decoder then appears as a separate application on top of the microbrowser. This software architecture precludes the use of the GIF format as an alternate to video formats in web sites accessed by cell phones; a microbrowser user with a non-video-capable phone must chose between seeing the GIF animation and hearing the audio track.

In field tests in a 3 G supported area, only approximately 10% of mobile devices tested were able to access specific videos in a test to assess the percentage of new mobile devices that can view video over the web. The videos ranged from 95 KB to 1 MB in size, and were encoded in 64 kb/s 3gp (MPEG-4 15 f/s 176×144 pixel video and AMR audio), with landing pages simultaneously available in html, wml and xhtml. Therefore, Internet-based systems do not provide a reliable solution for providing multimedia content to mobile devices.

Mobile devices generally support the Multimedia Messaging Service (MMS) standard, which allows the sending and receiving of multimedia messages, such as video, audio and graphics. Multimedia messaging is included in base voice plans, unlike microbrowser operation, which typically requires the user to subscribe to an additional data plan.

However, interoperability between service providers is hampered by proprietary protocols and other approaches to multimedia services. From the physical layer to the application layer, competing standards create technical challenges in providing multimedia content to mobile devices. These competing standards include signal coding, media encoding, data encapsulation, delivery protocols and operating systems.

Content adaptation presents a further complication. Content adaptation refers to the server processes of detecting the media types supported by a client, detecting when information requested by a client includes media object types not supported by the client, and reformatting these media objects into client supported formats. However, the typical implementation of content adaptation by wireless service providers in their multimedia messaging servers is more a liability than an asset, and may result in the removal of multimedia content or non-delivery of the message.

The challenge facing the delivery of cross-platform and cross-device multimedia content is thus not one of developing a communications protocol, but of identifying which of the many available protocols and media formats are in fact supported by each user. Although standards for device profiling exist, not all device hardware manufacturers, device software developers, and wireless service providers reliably maintain these standards. Interoperability barriers to multimedia services stem from both technological issues and business plans.

International multimedia message protocols were initially defined only for the Global System for Mobile Communications (GSM) wireless standard prevalent in Europe and used by some US carriers, the largest of which are Cingular/ATT and TMobile. However, some of these protocols such as Wireless Application Protocol (WAP) Push cannot be implemented in the Code Division Multiple Access (CDMA) wireless standard used in the US by Verizon and Sprint.

Some middleware, such as Qualcomm's Binary Runtime Environment for Wireless (Brew) used by CDMA carriers, prevents users of non-smart phones from installing 3rd party applications. Subscribers can only install software purchased from that carrier.

User Agent Profiles (UAProfs), on-line descriptions of cell phones' hardware and software configurations (e.g., screen size, codecs), are intended to support the automated tailoring of media to the capabilities of the recipient's device (i.e., content adaptation), but are incorrect or missing for over 20% of devices, primarily CDMA devices.

75% of cell phone owners do not access the web with their device (or pay for the option). Hence, there is no header from which to obtain a User Agent Profilee (UAProf) location.

HTTP Get headers of microbrowsers in Microsoft Windows-based devices usually include only the non-descript */* in their ACCEPT tag and do not specify any UAProf at all.

When an MMS originates from a different wireless carrier, content adaptation and local number portability resolution can strip multimedia content from the message, delay the message by hours, or not deliver the message at all.

The most significant drawback to multimedia messaging is that messages must traverse numerous service provider protocols before reaching the user's cell phone, and each protocol imposes message content constraints. Service providers typically configure their cell phones to retrieve multimedia messages from their own message servers. In order to continue using this configuration, a JITT system must deliver multimedia messages via these same message servers.

Ultimately, a system design that incorrectly assumes a communications protocol standard will not be suitable for providing multimedia content to mobile devices in an environment where reliability is essential. Given the chaotic state of affairs in the wireless domain and the importance of reliability in some applications of providing mobile content, such as JITT for SSPs, the challenge facing the delivery of cross-provider and cross-device mobile media is the correct identification of the many media formats and delivery protocols supported by each mobile device.

Multimedia content is composed of individual assets, such as JPEG images and audio clips, arranged in space and time (screen layout and timeline) by a "wrapper". The most prevalent multimedia wrappers and their associated delivery mechanisms are:

eXtensible HyperText Markup Language (XHTML) which is a text file which specifies the spatial layout of a web page. A microbrowser in a mobile device will recognize only basic XHTML commands, and rarely any proprietary extensions such as Internet Explorer's background sound. Assets are accessed via TCP-IP (i.e., the Internet), and wireless service providers typically charge extra for this connectivity. Any mobile device can receive the URL of an XHTML file via SMS, and some devices will retrieve the XHTML file with a simple click on the URL (instead of a copy-paste or retyping the URL in the microbrowser).

Synchronized Multimedia Integration Language (SMIL) is a text file which specifies the spatial and temporal layout of a multimedia message (including audio, picture and video messages). A multimedia message player can render background audio concurrently with imagery, which is an important instructional design advantage over a microbrowser. Assets are accessed by a multimedia message player via the MM1 wireless data protocol. Microbrowsers do not understand SMIL, although some are able to recognize a SMIL file when they encounter one, and relay it to the device's multimedia message player.

Video-Web pages and multimedia messages are collections of media files referenced by a text file written in XHTML or SMIL, respectively, whereas video is a single binary file. Nevertheless, video file extensions including .avi and .mov refer to the binary language of a wrapper that specifies the assets found in the same file, such as audio, video, caption, and hyperlinks. At a minimum, the wrapper component of a video file specifies the codec used to compress the audio and video components of the file. The MPEG-4 video codec and 3GPP file format were designed specifically for mobile devices (Apple and Real were leading contributors to these ratified standards), and Microsoft advocates its proprietary Windows Media Video format. Current video-enabled mobile devices will not render video in their microbrowser or multimedia message player; instead, any video file referenced in an XHTML or SMIL wrapper is relayed to the device's video player and rendered outside the XHTML or SMIL spatiotemporal context. A video player will have convenient controls for pause, play, forward, reverse, zoom, landscape, and portrait. Like SMIL, video renders animation with voiceover.

SUMMARY OF THE INVENTION

The present invention is directed to a computer system capable of providing multimedia content to mobile devices, regardless of carrier and mobile device type.

Furthermore, the present invention is directed to a system capable of providing multimedia content to mobile devices, regardless of carrier and mobile device type, wherein access to multimedia content related to an incident is granted using incident-based enrollment.

Furthermore, the present invention is directed to a system that can accept content from the field (e.g. multimedia from a cell phone, data from an environmental sensor, or position information from a GPS receiver on a mobile platform) and disseminate it to mobile devices, regardless of carrier and mobile device type.

In one embodiment, the present invention is directed to a JITT system for SSP wherein an Incident Commander (IC) or Safety Officer (SO) creates an incident-specific account via the Internet or by sending an email or some other communication to a content management system. Subsequently, messages, including multimedia messages with photos or videos, may be broadcast to recipients. The JITT system identifies the multimedia capabilities as well as the capabilities of the service provider for each SSP and uses this profile information to determine an appropriate messaging format to use to send the message to each SSP.

Since not all device hardware manufacturers, device software developers, and wireless service providers reliably maintain standards for device profiling (e.g., UAProf, HTTP GET headers), user involvement is used to determine the functionality and content type delivery for each user mobile device. This profiling may be performed in any of a number of different ways, including smart echo, caller-ID initiated (CIDI) and SMS initiated (SMSI) profiling. In smart echo profiling, the user sends the JITT system a multimedia sample from the mobile device, and the JITT system then sends messages and content to the mobile devise using the same format. In CIDI profiling, the JITT system sends test messages in different formats to the phone number of the device, and the user replies to the message having the best audiovisual experience. The system then uses the format associated with the reply message for further communications with the user. SMSI profiling is similar to CIDI profiling, except that the user sends an SMS instead of making a call.

BRIEF DESCRIPTION OF THE DRAWINGS

Embodiments of the present invention will be more readily understood from the detailed description of exemplary embodiments presented below considered in conjunction with the accompanying drawings, in which.

DETAILED DESCRIPTION

Illustrative Operating Environment

Figure 1:
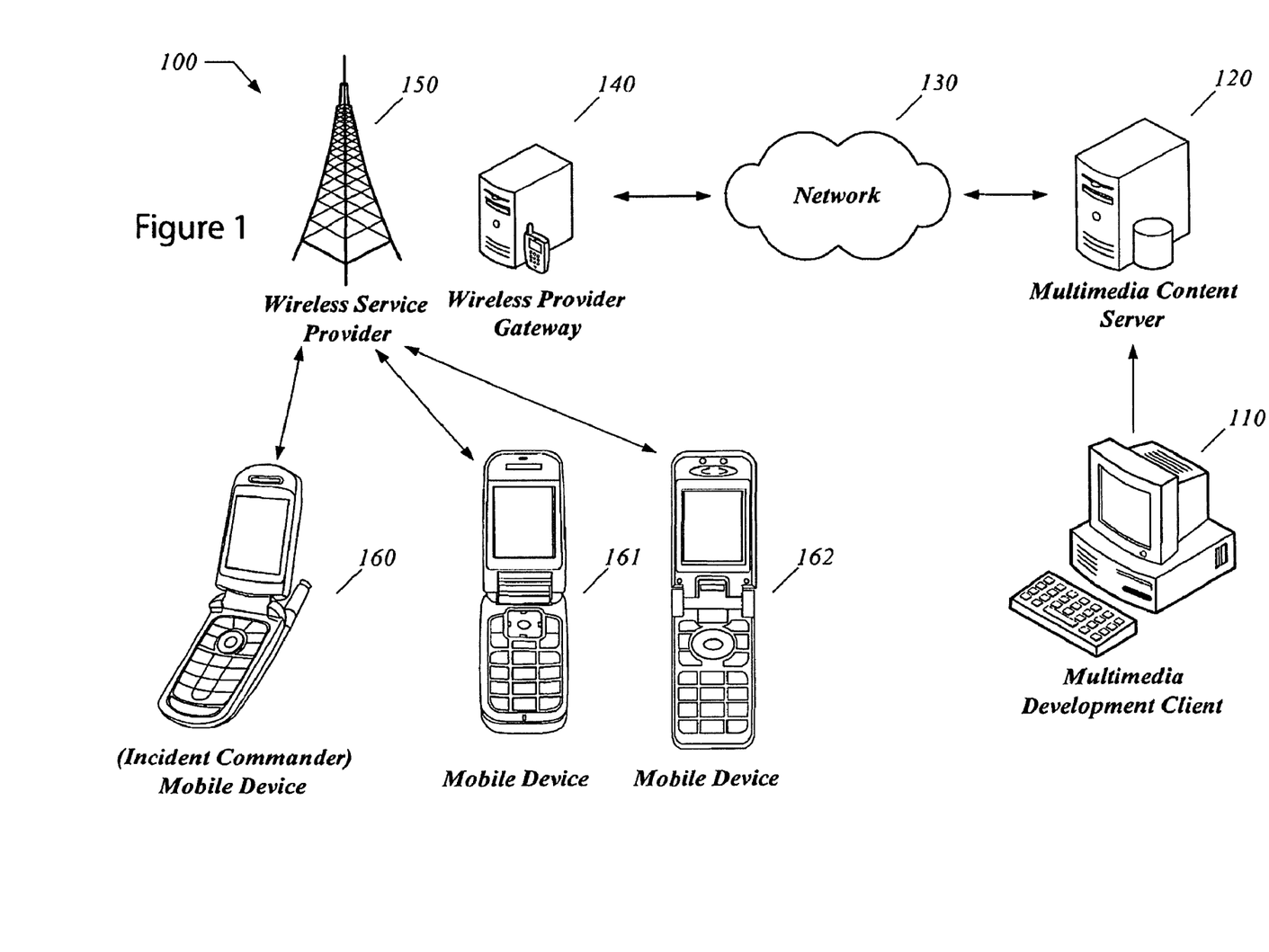
FIG. 1 is a system diagram of an environment in which one embodiment of the invention may be practiced.

FIG. 1 shows components of an environment in which one embodiment of the invention may be practiced. Not all the components may be required to practice the invention, and variations in the arrangement and type of the components may be made without departing from the spirit or scope of the invention.

A system providing multimedia content to mobile devices, such as that shown in FIG. 1, includes a multimedia content server 120, which can receive content from a multimedia development client 110, and provide the content by way of a network 130, a wireless provider gateway 140, and a wireless service provider 150, to mobile devices 160-162.

Multimedia development client 110 may include any computing device on which multimedia content may be created, including a personal computer, laptop, mobile device, or any other device. Multimedia development client 110 is used to manage multimedia content provided to multimedia content server 120, including developing, editing, optimizing, adding, deleting, or any other function relating to the multimedia content stored on the multimedia content server 120. Multimedia development client 110 may communicate with multimedia content server 120 through a local area network, wide area network, wireless network, or any other means. Multimedia development client 110 and multimedia content server 120 may also reside on the same computing device.

Multimedia content server 120 stores multimedia content and manages the transmission of multimedia content to mobile devices 160-162. The multimedia content provided is tailored to each mobile device 160-162. Multimedia content server 120 provides the specifically configured multimedia content through wireless service provider 150. Communications may be directed first to wireless provider gateway 140. Multimedia content server 120 communicates with wireless provider gateway 140 over network 130. Typically, network 130 may be the Internet. Multimedia content server 120 can also emulate a mobile device and communicate directly with wireless service provider 150.

Mobile devices 160-162 include any mobile device capable of displaying a graphic. Mobile devices 160-162 receive multimedia content from multimedia content server 120 by way of wireless service provider 150. Although one wireless service provider 150 is shown in FIG. 1, each mobile device 160-162 communicates with its own respective wireless service provider.

In one embodiment of the invention, mobile devices 160-162 can register to receive incident-specific multimedia content. Incident commander 160 is a mobile device which can create an incident-specific account, and which has control over the multimedia content provided to mobile devices 160-162 registered to receive incident-specific content.

Illustrative Server Device

Figure 2:
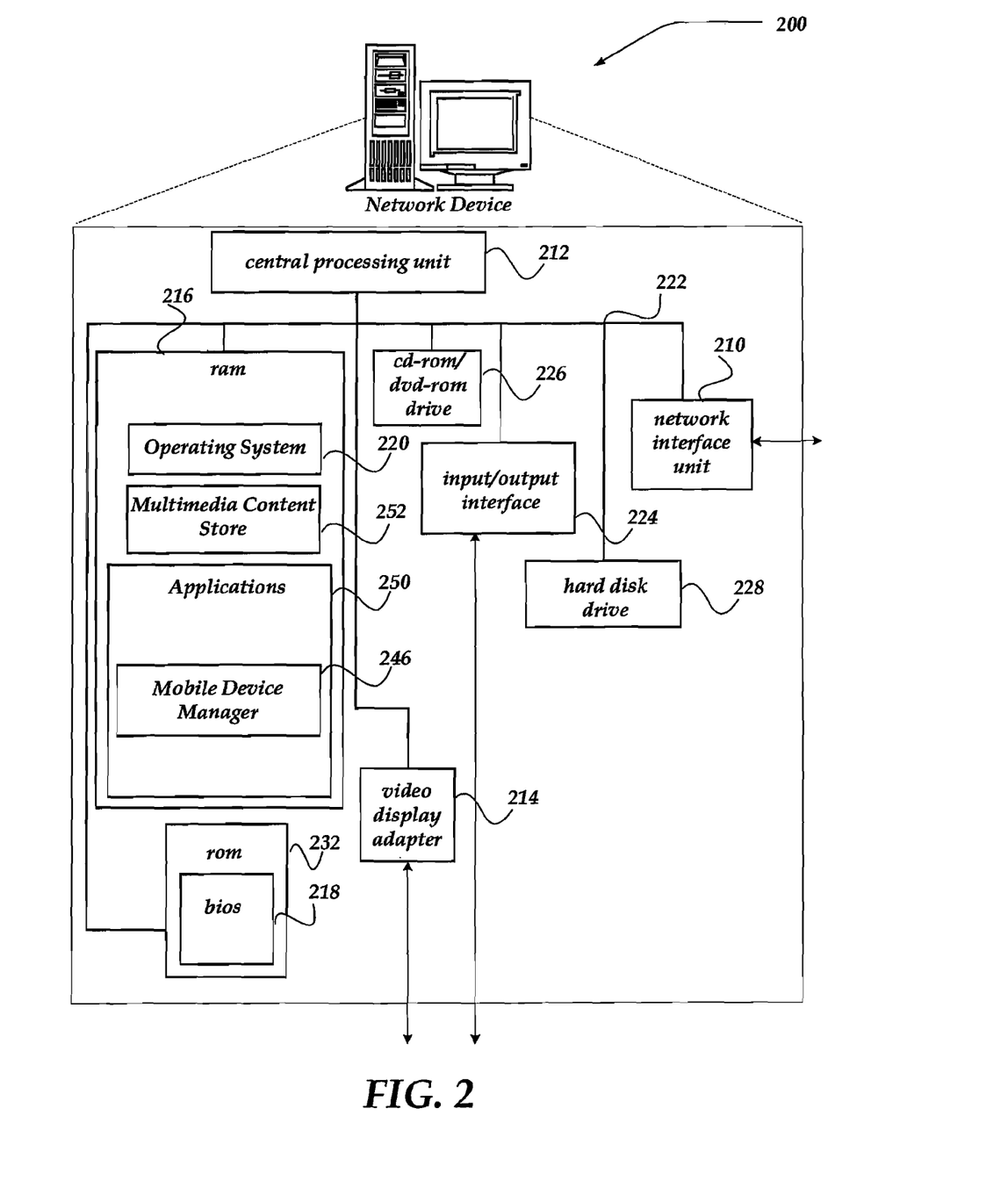
FIG. 2 is a block diagram of a server device of one embodiment of the invention.

FIG. 2 shows one embodiment of a network device according to the present invention. Network device 200 may include many more components than those shown. Network device 200 may be configured to operate as a server, client, peer, or any other device. The components shown, however, are sufficient to disclose an illustrative embodiment for practicing the invention. Network device 200 may represent, for example, multimedia content server 120 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general purpose operating system may be employed. Basic input/output system ("BIOS") 218 is also provided for controlling the low level operation of network device 200. Network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC). It may communicate to the network 130 and/or directly with a wireless service provider 100.

The mass memory as described above illustrates another type of computer readable media, namely computer storage media. Computer storage media may include volatile, non-volatile, removable, and non removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs (including XmlHTTPRequest (XHR), Asynchronous JavaScript and XML (AJAX), or JavaScript Object Notation (JSON) programs), customizable user interface programs, IPSec applications, encryption programs, security programs, account management, and so forth.

Multimedia content store 252 includes any component for storing multimedia content. Multimedia content may be stored in RAM 216, hard disk drive, 228, or the like. Multimedia content may also be stored in a database, or the like. In one embodiment, applications 250 may directly read and access multimedia content stored in multimedia content store 252.

Mobile device manager 246 includes any component for providing data to a mobile device, and may also be configured to receive and store information identifying a mobile device.

Generalized Operation

Most current multimedia-enabled mobile devices are supported by four different file formats (3GP, WMV, SMIL, HTML) and four different delivery mechanisms (MMS via MM1, e-mail attachment, URL via SMS, WAP push). In other words, there are 16 different ways to convey a multimedia experience to a mobile device, but only a few of these will be supported by the user's device, wireless provider, and service plan. Furthermore, the wireless provider may impose further limitations on the deliverable content. Since not all device hardware manufacturers, device software developers, and wireless service providers reliably maintain standards for device profiling (e.g., UAProf, HTTP GET headers), user involvement is required to verify the functionality of any content at the user's mobile device.

There are two options for communication with users' service providers: messaging over an MM1 channel, and e-mail over the Internet. MM1 is a ratified data transfer protocol standard for picture messaging between a mobile device and the carrier's gateway over GSM. MM1 is simple in that it deposits the content directly in the message in-box of the mobile device; however, some carriers limit content to 300 KB per message. Before the carrier's gateway delivers a multimedia message via MM1 to a mobile device, the gateway applies content adaptation to the message content.

To communicate via MM1, the system subscribes to a wireless service provider, and appears to that provider simply as a cell phone sending and receiving messages to/from other cell phones. When messaging a mobile device over the Internet, the system e-mails the device's e-mail address N@domain, where N is the device's ten-digit phone number and domain is a carrier specific domain. Because carriers route SMS and MMS messages differently, they often assign SMS and MMS different domains.

The Internet has much higher bandwidth than the MM1 channel, and can send more courses to more users per unit time. E-mails also have fast and equal access to all service providers, whereas messages sent over an MM1 channel to subscribers of different providers must traverse two sets of gateways (that of the sender's carrier and that of the recipient) and endure the content adaptation and latency of both. Cross-carrier delivery of multimedia messages is still an immature service that can vary from minutes to hours. A drawback of e-mailing a mobile device is that it requires the device's domain(s), whereas messages over MM1 are simply sent to N. The only way to confirm the domain(s) of a mobile device is for the user to send an SMS and an MMS to an email address. Some legacy cell phones can only send an SMS or an MMS to a phone number and not to an e-mail address. The processes described in FIG. 3 and FIG. 4 takes all these factors into account. It should be appreciated that not all steps are required to practice the invention, and variations in the order of the steps may be made without departing from the spirit or scope of the invention.

Figure 3:
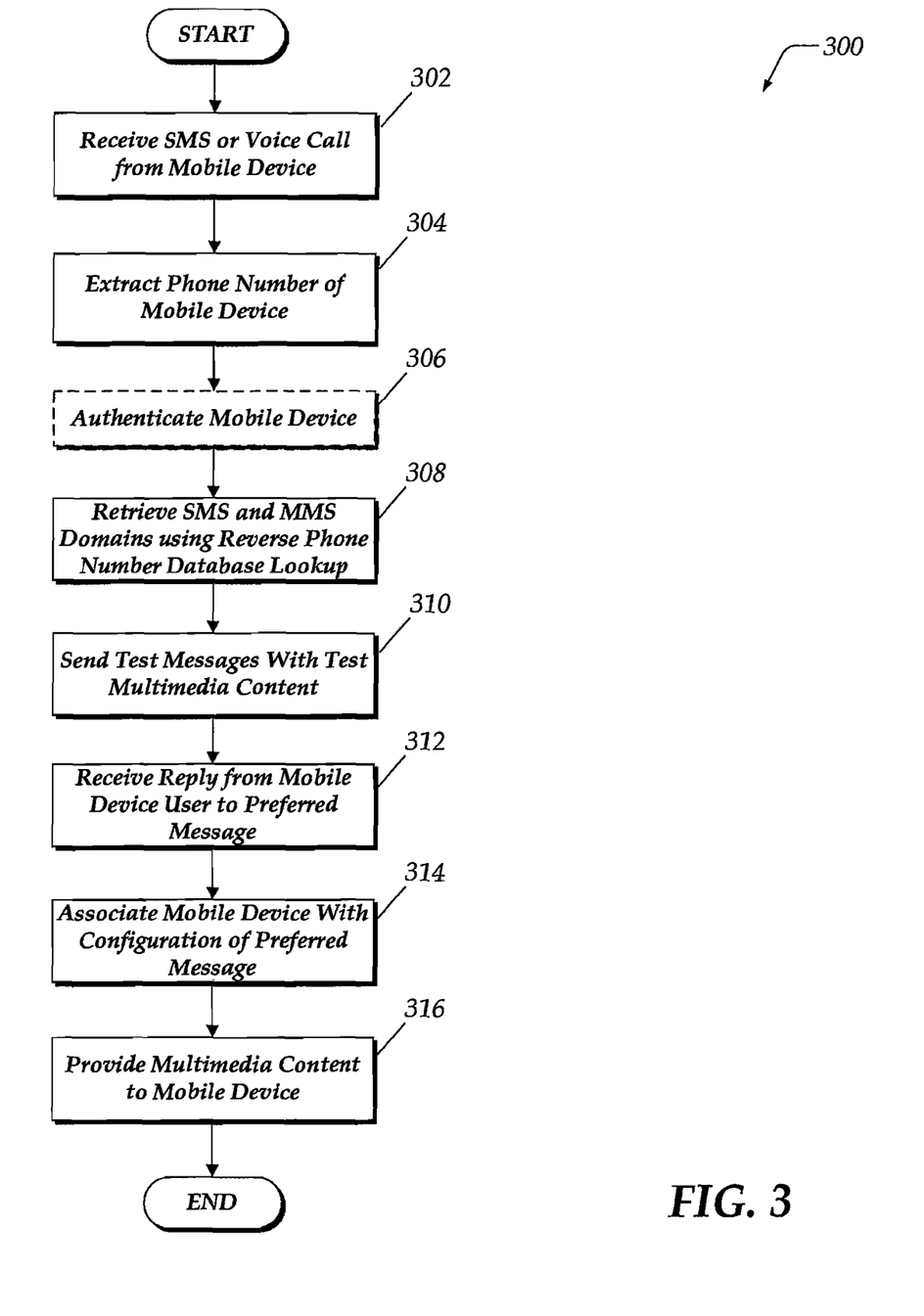
FIG. 3 illustrates a flow diagram generally showing one embodiment of a process for mobile device profiling and providing content to a mobile device according to the present invention.

FIG. 3 illustrates a flow diagram generally showing one embodiment of a process for mobile device profiling and providing content to a mobile device based on a SMS or voice call from the mobile device. Process 300 begins at block 302, where a SMS or voice call is received from a mobile device. A voice call may be received by an automated attendant configured to record information relating to the call, including any caller ID information and dual-tone multi-frequency (DTMF) key strokes entered by the caller. An SMS message may be received at a GSM phone number. Alternatively, an SMS message may be received at an e-mail address. Processing then continues to block 304.

At block 304, the phone number of the mobile device is extracted. The phone number can be extracted using calling number identification (CID), automatic number identification (ANI), information provided by an automated attendant receiving voice calls, a SMS header, or any other available method. Processing then continues to optional block 306.

At optional block 306, the phone number or any other information is used to authenticate the mobile device. In one embodiment of the invention, authentication is used to ensure the mobile device has been granted access to the multimedia content provided for a specific incident. Authentication may be performed using the phone number associated with the mobile device, requesting an incident ID or other access code from the mobile device, or any other means of authentication. In one embodiment of the invention, authentication is optional. For example, a system without authentication may be an asset in an emergency system capable of providing alerts to the local civilian population. Processing then continues to block 308.

At block 308, reverse phone number database lookup is used to retrieve the SMS and MS domains of the mobile service provider associated with the phone number. In one embodiment of the invention, the mobile service provider is identified using the caller ID's most significant seven digits. Processing then continues to block 310.

At block 310, test messages with test multimedia content are sent to the mobile device's SMS and MMS email addresses. In one embodiment of the invention, four e-mails are sent: (1) an SMS with a registration acknowledgement and test URL, (2) an MMS with a short 3GP clip, (3) an MMS with a short SMIL slideshow with audio, and (4) an MMS with HTML, imagery, and no audio. All four test messages should be successfully received by the mobile device. Processing then continues to block 312.

At block 312, a reply is received from the mobile device. In one embodiment of the invention, the mobile device user replies to the message out of the test messages which provides the best multimedia content, thus identifying the preferred format for the mobile device. Processing then continues to block 314.

At block 314, the mobile device is associated with the configuration in the preferred message format (i.e., the message which the mobile user replied to in block 314). Processing then continues to block 316.

At block 316, multimedia content is provided to the mobile device in the preferred format. In one embodiment, restrictions may be put on the provided multimedia content to prevent the content from being redistributed. These include a forward lock (the mobile device is not allowed to re-transmit non-text objects), restrictions on the number of times the content can be accessed, a restricted time interval for access, or any other restriction.

Figure 4:
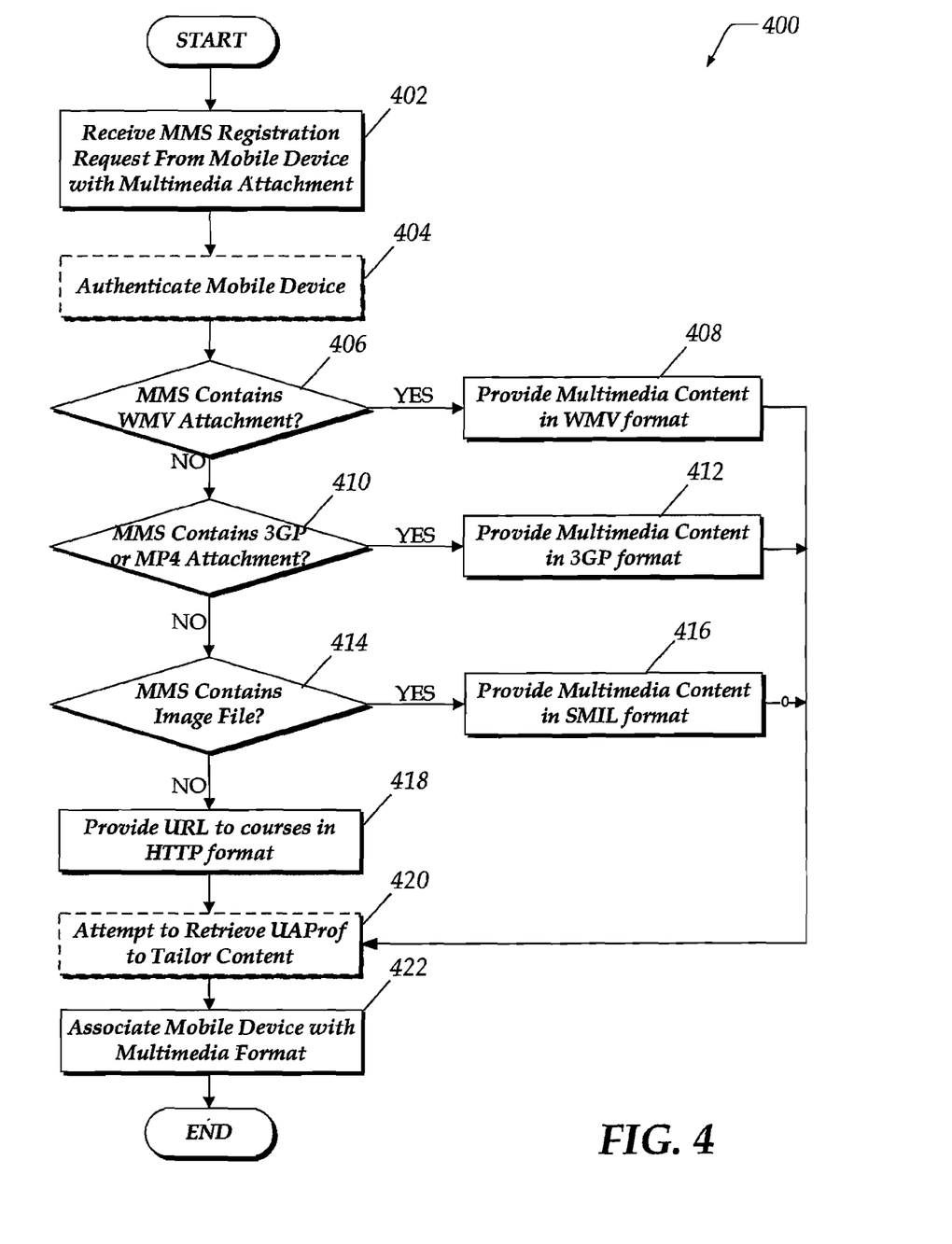
FIG. 4 illustrates a flow diagram generally showing one embodiment of a process for mobile device profiling and providing content to a mobile device according to the present invention.
Figure 6:
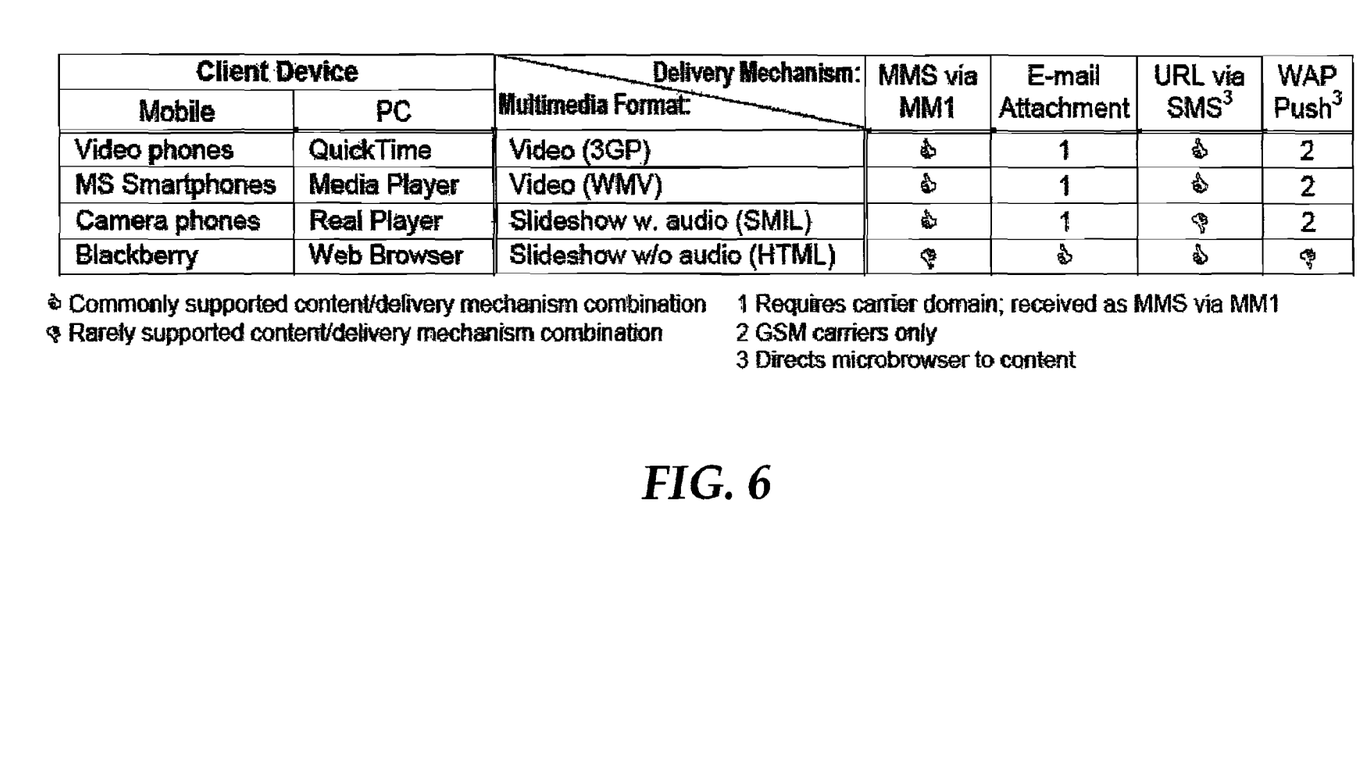
FIG. 6 is a table representing the major multimedia formats and delivery mechanisms available for providing multimedia content to mobile devices.

FIG. 4 illustrates a logical flow diagram generally showing one embodiment of a process for mobile device profiling through "smart echoing" and providing content to a mobile device. Smart echoing is compatible with mobile devices capable of sending a MMS. By evaluating the multimedia attachment sent by the mobile device, the system can determine the multimedia content that the mobile device can support. FIG. 6 presents a table summarizing multimedia formats and delivery mechanisms and the conditions under which the format and delivery mechanism combination tend to be supported.

Process 400 begins at block 402, where a MMS registration request with a multimedia attachment is received from a mobile device. In one embodiment of the invention, the message is received at a gateway e-mail address. Processing then continues to optional block 404.

At optional block 404, the phone number or other information is used to authenticate the mobile device. In one embodiment of the invention, authentication is used to ensure the mobile device has been granted access to the multimedia content provided for a specific incident. Authentication may be performed using the phone number associated with the mobile device, requesting an incident ID or other access code from the mobile device, or any other means of authentication. Processing then continues to decision block 406.

At decision block 406, it is determined if the MMS received from the mobile device contains a multimedia attachment with a WMV extension. If the attachment has a WMV extension, processing continues to block 408. Otherwise, processing continues to decision block 410. At block 408, multimedia content is provided to the mobile device in WMV format. Processing then continues to optional block 420.

At decision block 410, it is determined if the MMS received from the mobile device contains a 3GP or MP4 file. If the attachment contains a 3GP or MP4 file, processing continues to block 412. Otherwise, processing continues to decision block 414. At block 412, multimedia content is provided to the mobile device in 3GP format. Processing then continues to optional block 420.

At decision block 414, it is determined if the MMS received from the mobile device contains an image file, (e.g. .JPG, .GIF, .BMP, or any other image format). If the attachment contains an image file, processing continues to block 416. Otherwise, processing continues to block 418. At block 416, multimedia content is provided to the mobile device in SMIL format. Processing then continues to optional block 420.

At block 418, multimedia content is provided to the mobile device in HTTP format. More specifically, having eliminated the other formats, the system replies with an SMS containing the URL of the courses in HTTP format. Processing then continues to optional block 420.

At optional block 420, an attempt is made to retrieve the user agent profile (UAProf) of the mobile device so that the multimedia content provided may be further tailored for optimal display on the mobile device. The UAProf describes the hardware and software properties of the device, such as screen size and color depth. A WAP GET request includes the user agent profile. Content that is accessed via a microbrowser is easily tailored because the microbrowser's WAP GET request includes the user agent profile and supported MIME list of the device. However, under the MM1 protocol, the profile is sent to the service provider's WAP gateway, whose IP address is encoded in the phone (CDMA) or SIM card (GSM), and not to the recipient of the multimedia message. GSM phones support other messaging techniques, in particular the WAP Push message and an MMS Notification message, that force the recipient phone to issue a WAP GET request to a server specified by the sender. In the case of WAP Push, the binary SMS message contains the URL of a file; when the user selects the message from the inbox, the phone issues a WAP GET request, retrieves the file from the Internet, and displays it on the microbrowser. An MMS Notification message is another binary SMS message containing a URL to a file that the phone retrieves with a WAP GET request. It differs from a WAP Push message in that the URL must point to a compiled multimedia message file (type .MMS, as opposed to web media) which the phone displays using its multimedia message player (as opposed to the microbrowser). CDMA only supports WAP GET requests issued from a microbrowser. Consequently, if a CDMA user with a capable device seeks a better audiovisual quality than that of the baseline MMS, the user will have submit his phone number through the mobile device's microbrowser.

At block 422, the mobile device is associated with the multimedia format selected using the device profiling method described at blocks 402-420, which was initiated by the MMS registration request in block 402.

Figure 5:
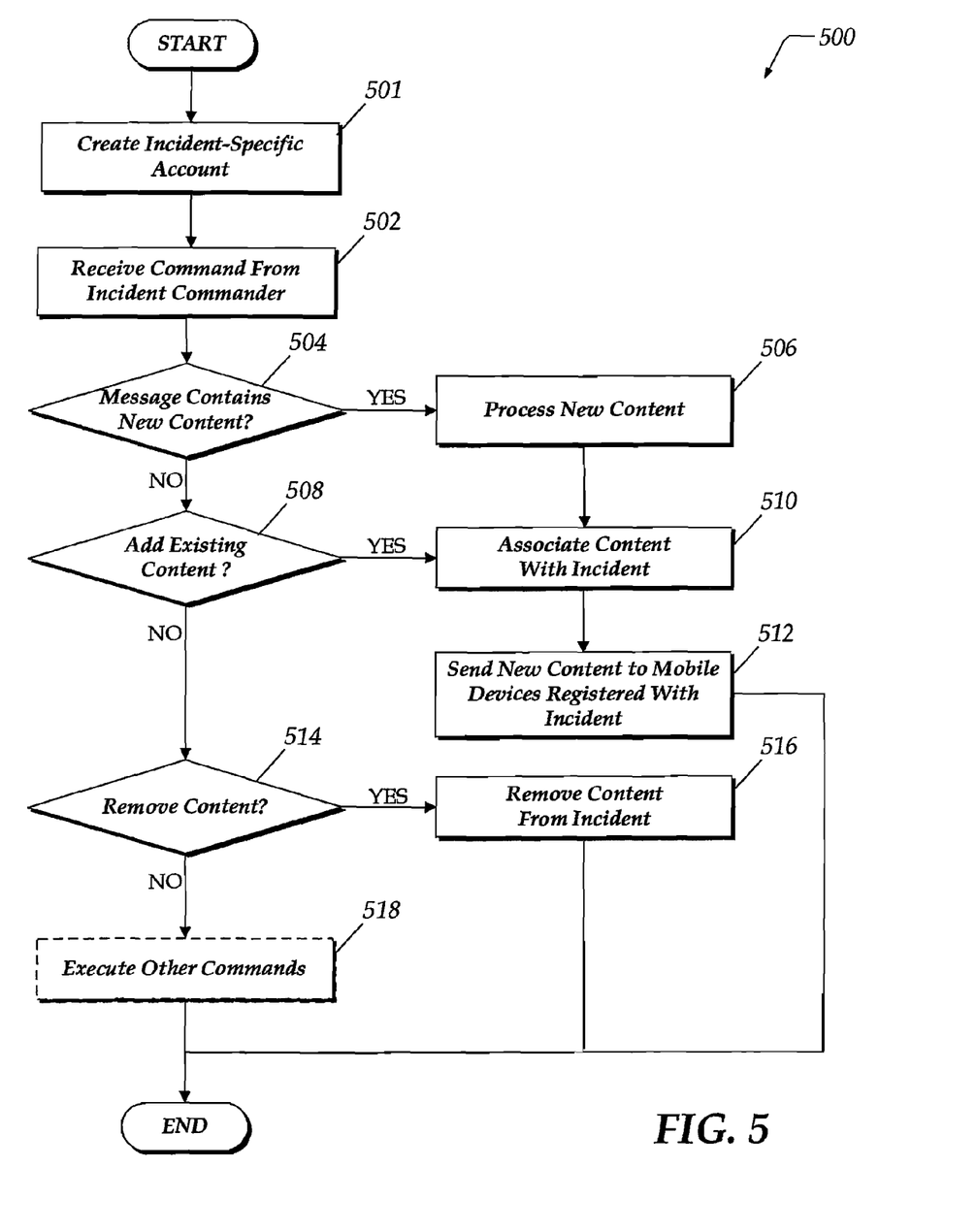
FIG. 5 illustrates a flow diagram generally showing one embodiment of a process for allowing an incident commander to control content provided to a mobile device registered with an incident according to the present invention.

FIG. 5. illustrates a logical flow diagram generally showing one embodiment of a process for allowing an incident commander to control content provided to a mobile device registered with an incident. For example, in the case of SSP responding to an emergency, the incident commander or safety officer may need to broadcast information to the skilled support personnel. This may include information conveyable with simple text, such as the evacuation of an area, or a reminder to wear a gas mask. Alternatively, the information may be best presented in multimedia, such as photos of a newly discovered CBRNE agent at the site and the agent-specific PPE that SSP must now wear. A safety officer acting as the incident commander may recommend courses for the incident, update course recommendations (e.g., if a new threat is found), and broadcast messages (including multimedia messages with photos and videos) to the SSP in real-time. Moreover, this information must be received not only by the SSP who were already registered with the incident at the time of broadcast, but also by newly dispatched SSPs registered after the change.

Process 500 begins at block 501, where an incident commander creates a new incident-specific account. In one embodiment of the invention, the incident commander creates an account through SMS, email, or another method available on a mobile device. The incident commander may receive a response containing a unique incident ID number and administrative access to the incident. In one embodiment of the invention, this ID may be distributed by a dispatcher so that other mobile devices can use the ID to access the multimedia content associated with the incident. Processing then continues to block 502.

At block 502, a command is received from an incident commander. The command may be received as an e-mail, SMS, MMS, or the like, which references the incident. In one embodiment of the invention, the incident commander is the creator of the incident-specific account. The incident commander may also be associated with another mobile device registered with the incident and granted incident commander privileges. In another embodiment of the invention, the incident commander may exercise control over multimedia content from a computing device other than a mobile device. In another embodiment of the invention, sensors may automatically send measurements, such as toxic gas readings, on behalf of the incident commander. Processing then continues to decision block 504.

At decision block 504, it is determined if the message from the incident commander contains new content. New content may include text and/or multimedia content created by the incident commander, or any other multimedia content which is not currently available on the multimedia content server. If the message contains new multimedia content, processing continues to block 506. Otherwise, processing continues to block 508.

At block 506, new content included in the command is processed such that the new content can be distributed to mobile devices. Processing then continues to decision block 510.

At decision block 508, it is determined if the message from the incident commander contains a request to add existing content available on the multimedia content server to the incident. If the message contains a request to add existing content, processing continues to block 510. Otherwise, processing continues to decision block 514.

At block 510, new or existing content is associated with the incident. This allows newly registered mobile devices to access the content. Processing then continues to block 512.

At block 512, the content added to the incident-specific account is sent to all mobile devices currently registered with the incident.

At decision block 514 it is determined if the message from the incident commander contains a request to remove content from the list of content associated with the incident. If the message contains a request to remove content, processing continues to block 516. Otherwise processing continues to optional block 518.

At block 516, the requested content is removed from the list of content associated with the incident.

At optional block 518, any other commands issued by the incident commander are addressed.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method of transmitting content information to a user using a predetermined content delivery format, the method comprising the following steps:
    receiving a phone call from a communication device associated with the user;
    determining a phone number associated with the user based on information received in connection with the phone call;
    using the phone number to identify a service provider associated with the user communication device;
    transmitting a plurality of test messages to the user communication device, each test message having a different format;
    receiving a reply from the user communication device in response to a selected one of the plurality of test messages which results in a desired delivery of the test message in a preferred format.

2. The method of claim 1, further comprising the following step:
    determining at least one of the SMS and MMS domains associated with the identified service provider.

3. The method of claim 2, wherein the transmitting step further comprises the step of transmitting the plurality of messages to an address associated with said at least one SMS and MMS domains.

4. The method of claim 1, further comprising the step of creating a user configuration, wherein said user configuration includes information corresponding to said preferred format.

5. The method of claim 4, wherein the preferred format allows the user to experience the message in a preferred multimedia format.

6. The method of claim 4, further comprising the following step:
    transmitting a subsequent message to said user using said preferred format.

7. The method of claim 1, further comprising the step of authenticating the user communication device.

8. A method of transmitting content information to a user using a predetermined content delivery format, the method comprising the following steps:
    receiving an SMS message from a communication device associated with the user, the SMS message including information corresponding to a phone number of the user;
    determining a phone number associated with the user based on information received in connection with the phone call;
    using the phone number to identify a service provider associated with the user communication device;
    transmitting a plurality of test messages to the user communication device, each test message having a different format;
    receiving a reply from the user communication device in response to a selected one of the plurality of test messages which results in a desired delivery of the test message in a preferred format.

9. The method of claim 8, further comprising the following step:
    determining at least one of the SMS and MMS domains associated with the identified service provider.

10. The method of claim 9, wherein the transmitting step further comprises the step of transmitting the plurality of messages to an address associated with said at least one SMS and MMS domains.

11. The method of claim 8, further comprising the step of creating a user configuration, wherein said user configuration includes information corresponding to said preferred format.

12. The method of claim 11, wherein the preferred format allows the user to experience the message in a preferred multimedia format.

13. The method of claim 11, further comprising the following step:
    transmitting a subsequent message to said user using said preferred format.

14. The method of claim 8, further comprising the step of authenticating the user communication device.

15. A method of transmitting content information to a user using a predetermined content delivery format, the method comprising the following steps:
    receiving a registration request from a communication device associated with a user, the registration request including an attachment;
    determining whether the attachment is of a first type of format, and if so, then associating the first type of format with the user when subsequently transmitting content to the user;
    otherwise, determining whether the attachment is of a second type of format, and if so, then associating the second type of format with the user when subsequently transmitting content to the user;
    otherwise, associating a third type of format with the user to allow content to be received by the user;
    using at least one of the first and second format types to transmit content information to the user when either of the determining steps determines that the attachment is of one of the first and second format types.

16. The method of claim 15, wherein the first format type is a WMV format, and the second format type is a 3GP or MP4 format.

17. The method of claim 15, wherein the third format type is a text format which is used to indicate a URL to the user where the content may be found.

18. A method of transmitting just in time training information to a plurality of support personnel each having a respective mobile communication device, using a predetermined content delivery format, the method comprising the following steps:

receiving a communication from a communication device associated with each support person;

determining a phone number associated with each support person based on information received in connection with the phone call;

using the phone number to identify a service provider associated with the support person communication device;

transmitting a plurality of test messages to each support person communication device, each test message having a different format;

receiving a reply from the support person communication device in response to a selected one of the plurality of test messages which results in a desired delivery of the test message in a preferred format.

19. A method of transmitting just in time training information to a plurality of support personnel each having a respective mobile communication device, using a predetermined content delivery format, the method comprising the following steps:

receiving a registration request from a respective communication device associated with each support person, the registration request including an attachment;

for each registration request:
determining whether the attachment is of a first type of format, and if so, then associating the first type of format with the respective support person when subsequently transmitting content to the support person;

otherwise, determining whether the attachment is of a second type of format, and if so, then associating the second type of format with the support person when subsequently transmitting content to the support person;

otherwise, associating a third type of format with the support person to allow content to be received by the support person;

using at least one of the first and second format types to transmit content information to the support person when either of the determining steps determines that the attachment is of one of the first and second format types.

20. A non-transitory computer readable medium encoded with processing instructions for performing a method of transmitting content information to a user using a predetermined content delivery format, the method comprising the following steps:

receiving a phone call from a communication device associated with the user;

determining a phone number associated with the user based on information received in connection with the phone call;

using the phone number to identify a service provider associated with the user communication device;

transmitting a plurality of test messages to the user communication device, each test message having a different format;

receiving a reply from the user communication device in response to a selected one of the plurality of test messages which results in a desired delivery of the test message in a preferred format.

21. A non-transitory computer readable medium encoded with processing instructions for performing a method of transmitting content information to a user using a predetermined content delivery format, the method comprising the following steps:

receiving an SMS message from a communication device associated with the user, the SMS message including information corresponding to a phone number of the user;

determining a phone number associated with the user based on information received in connection with the phone call;

using the phone number to identify a service provider associated with the user communication device;

transmitting a plurality of test messages to the user communication device, each test message having a different format;

receiving a reply from the user communication device in response to a selected one of the plurality of test messages which results in a desired delivery of the test message in a preferred format.

22. A non-transitory computer readable medium encoded with processing instructions for performing a method of transmitting content information to a user using a predetermined content delivery format, the method comprising the following steps:

receiving a registration request from a communication device associated with a user, the registration request including an attachment;

determining whether the attachment is of a first type of format, and if so, then associating the first type of format with the user when subsequently transmitting content to the user;

otherwise, determining whether the attachment is of a second type of format, and if so, then associating the second type of format with the user when subsequently transmitting content to the user;

otherwise, associating a third type of format with the user to allow content to be received by the user;

using at least one of the first and second format types to transmit content information to the user when either of the determining steps determines that the attachment is of one of the first and second format types.

23. A non-transitory computer readable medium encoded with processing instructions for performing a method of transmitting just in time training information to a plurality of support personnel each having a respective mobile communication device, using a predetermined content delivery format, the method comprising the following steps:

receiving a communication from a communication device associated with each support person;

determining a phone number associated with each support person based on information received in connection with the phone call;

using the phone number to identify a service provider associated with the support person communication device;

transmitting a plurality of test messages to each support person communication device, each test message having a different format;

receiving a reply from the support person communication device in response to a selected one of the plurality of test messages which results in a desired delivery of the test message in a preferred format.

24. A non-transitory computer readable medium encoded with processing instructions for performing a method of transmitting just in time training information to a plurality of support personnel each having a respective communication device, using a predetermined content delivery format, the method comprising the following steps:
- receiving a registration request from a respective communication device associated with each support person, the registration request including an attachment;
- for each registration request:
  - determining whether the attachment is of a first type of format, and if so, then associating the first type of format with the respective support person when subsequently transmitting content to the support person;
  - otherwise, determining whether the attachment is of a second type of format, and if so, then associating the second type of format with the support person when subsequently transmitting content to the support person;
  - otherwise, associating a third type of format with the support person to allow content to be received by the support person;
  - using at least one of the first and second format types to transmit content information to the support person when either of the determining steps determines that the attachment is of one of the first and second format types.

25. A system for transmitting content information to a user using a predetermined content delivery format, the system comprising:
- a microprocessor;
- a program memory device containing instructions for causing the microprocessor to perform the following steps:
  - receiving a phone call from a communication device associated with the user;
  - determining a phone number associated with the user based on information received in connection with the phone call;
  - using the phone number to identify a service provider associated with the user communication device;
  - transmitting a plurality of test messages to the user communication device, each test message having a different format;
  - receiving a reply from the user communication device in response to a selected one of the plurality of test messages which results in a desired delivery of the test message in a preferred format.

26. A non-transitory computer readable medium encoded with processing instructions for performing a method of receiving multimedia and data from a plurality of registered users each having a respective mobile communication device, the method comprising the following steps:
- receiving a registration request from a respective communication device associated with each user, the registration request including an attachment;
- for each registration request:
  - determining whether the attachment is of a first type of format, and if so, then associating the first type of format with the respective support person when subsequently transmitting content to the support person;
  - otherwise, determining whether the attachment is of a second type of format, and if so, then associating the second type of format with the support person when subsequently transmitting content to the support person;
  - otherwise, associating a third type of format with the support person to allow content to be received by the support person;
  - using at least one of the first and second format types to transmit content information to the support person when either of the determining steps determines that the attachment is of one of the first and second format types.

* * * * *